United States Patent
Shinojima

(10) Patent No.: US 9,551,891 B2
(45) Date of Patent: Jan. 24, 2017

(54) DISPLAY MODULE AND DISPLAY DEVICE

(71) Applicant: Japan Display Inc., Tokyo (JP)

(72) Inventor: Kazumoto Shinojima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/703,428

(22) Filed: May 4, 2015

(65) Prior Publication Data

US 2015/0338697 A1    Nov. 26, 2015

(30) Foreign Application Priority Data

May 23, 2014   (JP) ................................ 2014-107432

(51) Int. Cl.
*G02F 1/1333* (2006.01)
*B60K 35/00* (2006.01)

(52) U.S. Cl.
CPC ......... *G02F 1/133308* (2013.01); *B60K 35/00* (2013.01); *G02F 2001/133314* (2013.01); *G02F 2001/133328* (2013.01); *G02F 2201/465* (2013.01)

(58) Field of Classification Search
CPC ......... G02F 2001/133328; G02F 2001/133314
USPC ........................................................ 349/58
See application file for complete search history.

(56) References Cited

U.S. PATENT DOCUMENTS

| 2005/0062902 | A1* | 3/2005 | Fukayama | ........ G02F 1/133308 349/58 |
| 2011/0141391 | A1* | 6/2011 | Kim | ..................... G02B 6/0093 349/61 |

FOREIGN PATENT DOCUMENTS

JP     2008-299181     12/2008

* cited by examiner

*Primary Examiner* — Phu Vu
(74) *Attorney, Agent, or Firm* — K&L Gates LLP

(57) ABSTRACT

According to an aspect, a display module includes a display panel that displays an image on a display surface; an optical member; and a housing that supports the display panel and the optical member. The housing includes a first housing, a second housing, and a third housing that is arranged on a side of the second housing opposite to the first housing side. An end of the first housing on a display surface side of the display panel protrudes toward the center of the display surface to face an outer edge of the display surface. An end of the second housing on a side opposite to the display surface side of the display panel protrudes toward the center of the display surface to face an outer edge of a surface opposite to the display surface. The optical member is provided between the second housing and the third housing.

5 Claims, 5 Drawing Sheets

DISPLAY MODULE AND DISPLAY DEVICE

CROSS REFERENCES TO RELATED APPLICATIONS

The present application claims priority to Japanese Priority Patent Application JP 2014-107432 filed in the Japan Patent Office on May 23, 2014, the entire content of which is hereby incorporated by reference.

BACKGROUND

1. Technical Field

The present disclosure relates to a display module including a display panel and a support that supports the display panel and to a display device.

2. Description of the Related Art

Display devices displays an image on a display surface of a display panel, such as a liquid crystal display (LCD) panel and an organic electroluminescence (EL) panel. The display panel has film-shaped (sheet-shaped) optical members laminated thereon to improve the display quality, for example. The display panel is a plate member the outer periphery of which is supported by another member.

An LCD device described in Japanese Patent Application Laid-open Publication No. 2008-299181 (JP-A-2008-299181) includes, in a housing, a liquid crystal panel, a sheet-shaped optical member (an optical sheet), a light guide plate, a pair of light source mounting substrates, and a plurality of light sources. The LCD device described in JP-A-2008-299181 further includes a second frame and a rubber cushion between the liquid crystal panel and the optical sheet.

In some display devices, the sheet-shaped optical member is fixed to the housing with an adhesive or an adhesive sheet. If the sheet-shaped optical member is fixed to the housing in a manner bonded with an adhesive or sandwiched between some members including a rubber cushion placed in close contact with the sheet-shaped optical member as described in JP-A-2008-299181, for example, distortion, sag, wrinkles, or other failures may possibly occur. Such distortion, sag, wrinkles, or other failures deteriorate an image to be displayed.

For the foregoing reasons, there is a need for a display module and a display device that can support a display panel and a film-shaped member overlapped with the display panel and can suppress the deterioration of images.

SUMMARY

According to an aspect, a display module includes a display panel that displays an image on a display surface; an optical member having a sheet shape and overlapped with the display panel; and a housing that supports the display panel and the optical member. The housing includes a first housing that covers an outer periphery of the display panel, an end of the first housing on a display surface side of the display panel protruding toward the center of the display surface to face an outer edge of the display surface; a second housing that covers the outer periphery of the display panel and is connected to the first housing, an end of the second housing on a side opposite to the display surface side of the display panel protruding toward the center of the display surface to face an outer edge of a surface opposite to the display surface; and a third housing arranged on a side of the second housing opposite to the first housing side, connected to the second housing, and provided with the optical member between the second housing and the third housing.

Additional features and advantages are described herein, and will be apparent from the following Detailed Description and the figures.

DETAILED DESCRIPTION

An exemplary embodiment according to the present disclosure is described below in detail with reference to the accompanying drawings. The contents described in the embodiment below are not intended to limit the present disclosure. Components described below include components easily conceivable by those skilled in the art and substantially identical components. The components described below may be appropriately combined.

Figure 1:
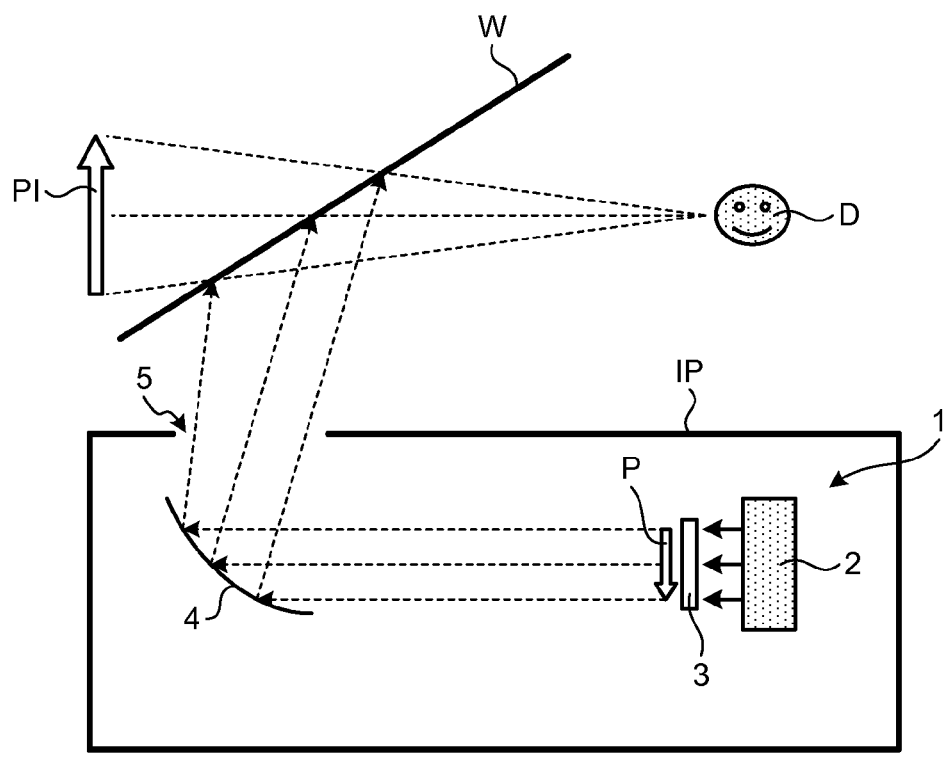
FIG. 1 is a schematic of a display device according to an embodiment.

FIG. 1 is a schematic of a display device according to an embodiment. An explanation will be made of the case where a display module according to the present embodiment is provided to a display device 1. The display device 1 is a head-up display device mounted on a vehicle, such as a car, a bus, and a truck, to display information, such as the speed and the traveling direction of the vehicle and the surrounding conditions, on a front window W of the vehicle. The use of the display device 1 enables a driver D of the vehicle to view the information displayed on the front window W almost without averting his/her eyes from the front.

The display device 1 is housed in a front panel IP of the vehicle. The display device 1 includes a light source 2, an LCD module 3, and a mirror 4. While the light source 2 is a light emitting diode (LED), for example, it is not limited thereto.

Figure 2:
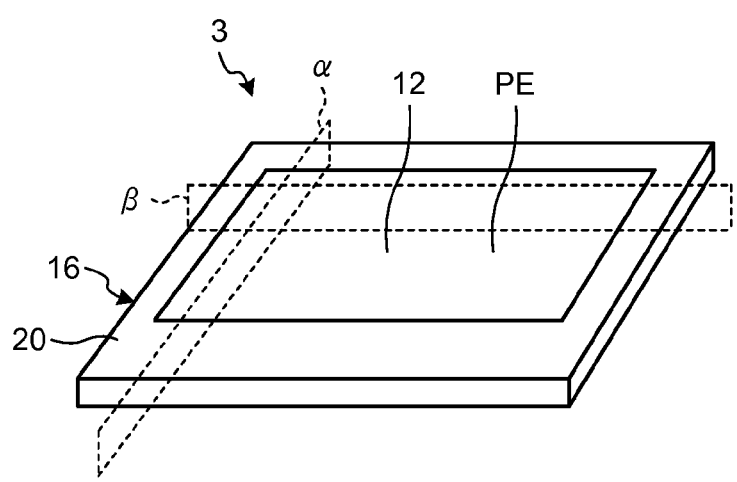
FIG. 2 is a perspective view of an LCD module included in the display device according to the present embodiment.

FIG. 2 is a perspective view of the LCD module included in the display device according to the present embodiment. The LCD module 3 has a display surface PE on which an image P is displayed. The mirror 4 is a concave mirror. Light is emitted from the display surface PE of the LCD module 3 to the mirror 4, thereby projecting the image P onto the mirror 4. The front panel IP has an opening 5 formed at a position facing the mirror 4, specifically a position at which light emitted from the LCD module 3 and reflected by the mirror 4 arrives.

The image P projected by the LCD module 3 is reflected by the mirror 4, passes through the opening 5, and is projected onto the front window W. The mirror 4 enlarges the image P and projects the enlarged image onto the front window W. The driver D views the image projected on the front window W. This causes the driver D to recognize a virtual image PI of the image P projected by the LCD module 3 through the front window W.

Figure 3:
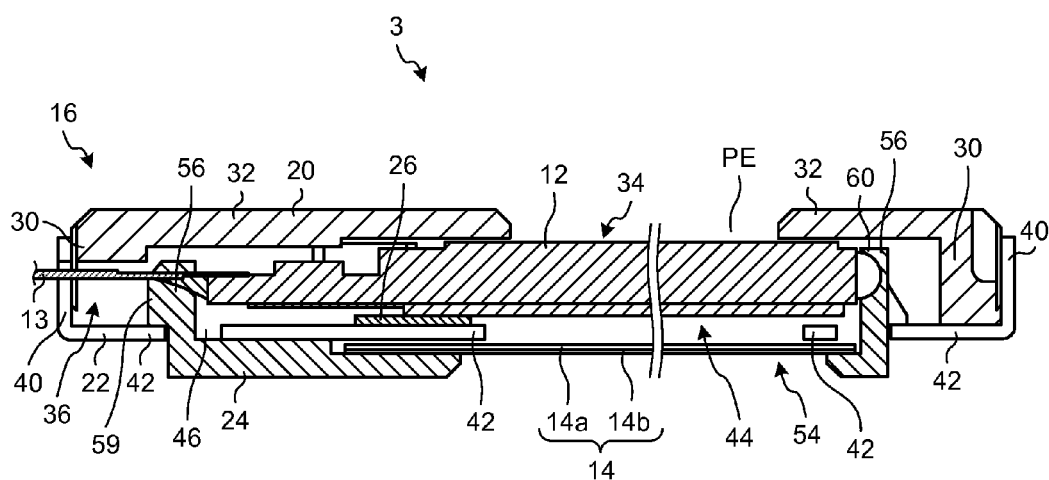
FIG. 3 is a sectional view along plane α in FIG. 2.
Figure 4:
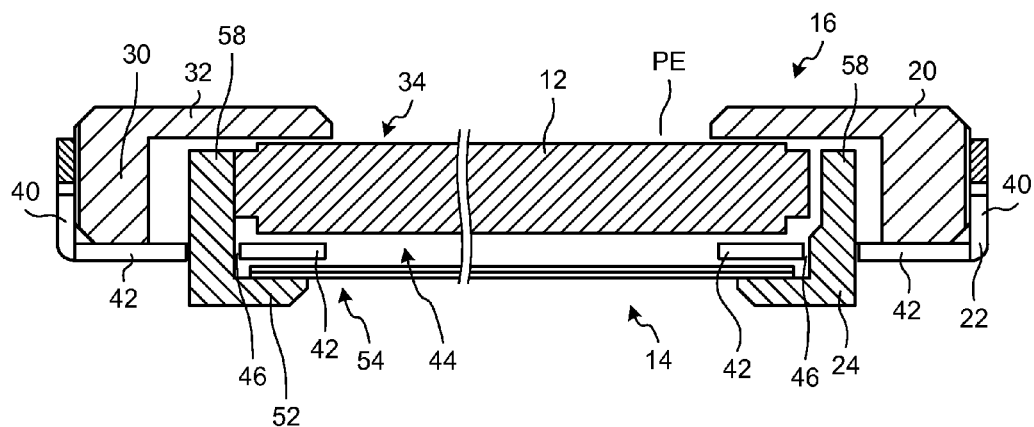
FIG. 4 is a sectional view along plane β in FIG. 2.
Figure 5:
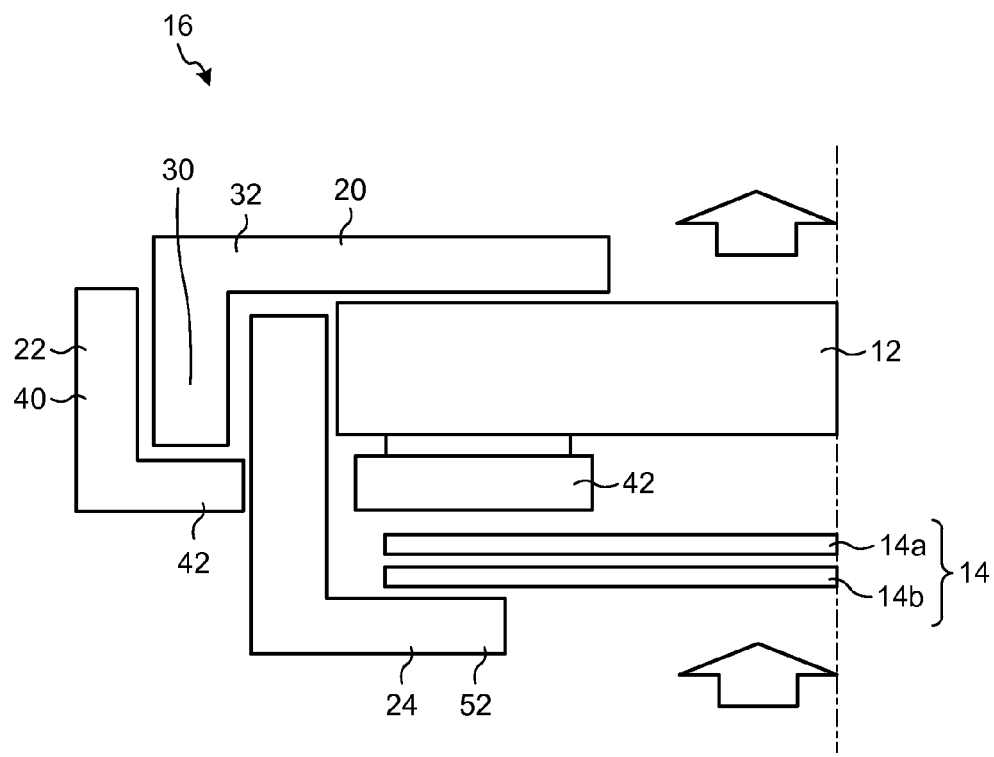
FIG. 5 is an enlarged sectional view of the LCD module.
Figure 6:
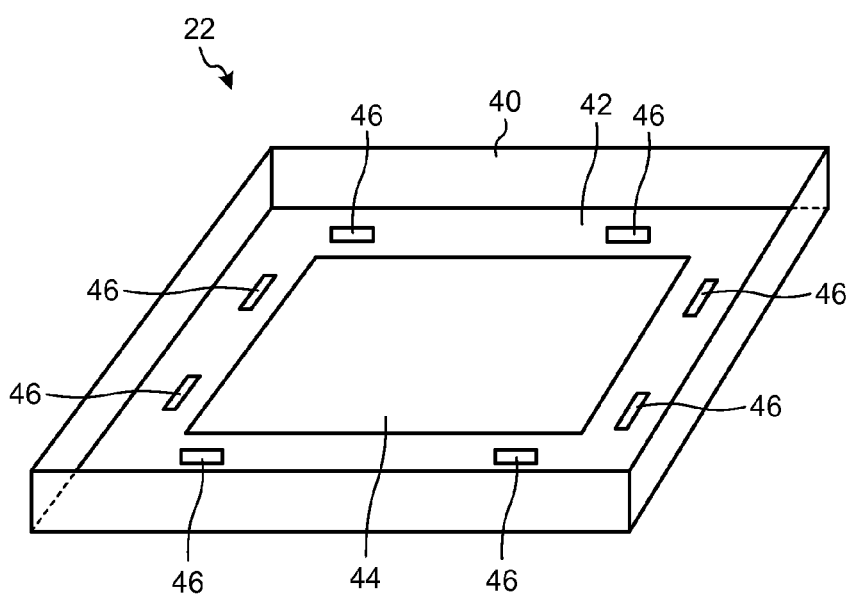
FIG. 6 is a perspective view of a schematic structure of a second housing.
Figure 7:
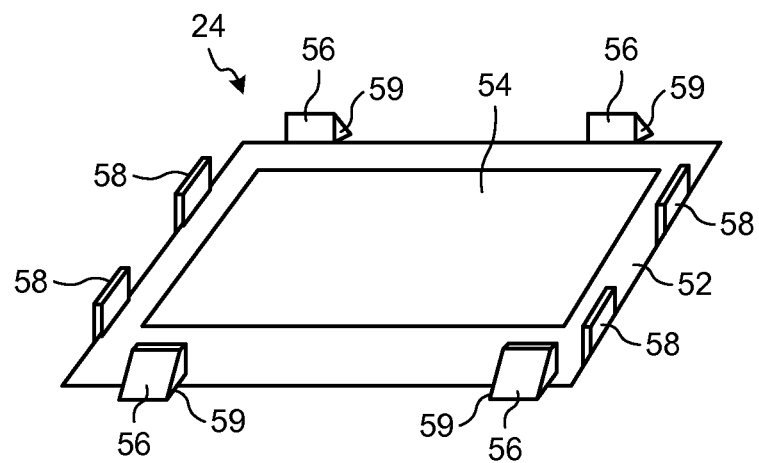
FIG. 7 is a perspective view of a schematic structure of a third housing.
Figure 8:
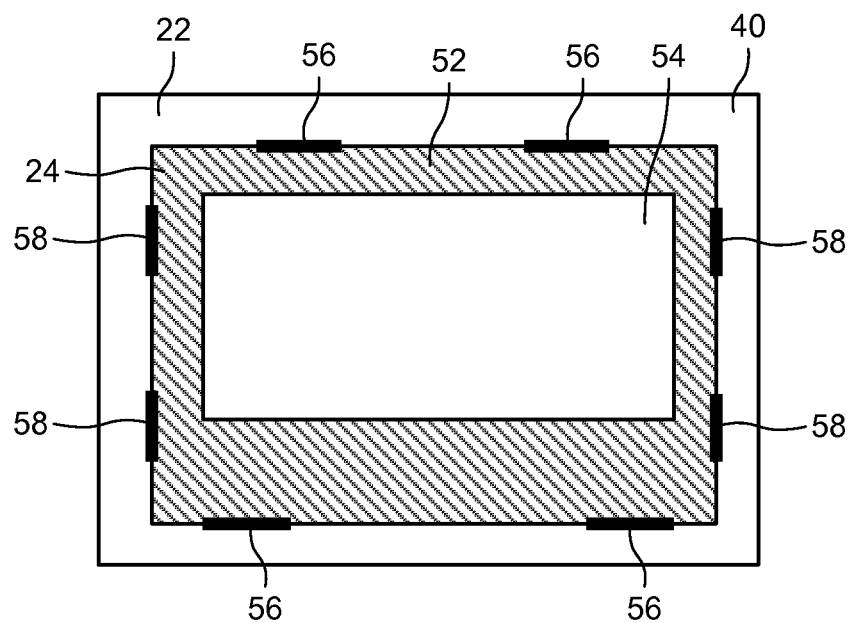
FIG. 8 is a front view illustrating the relation between the second housing and the third housing.
Figure 9:
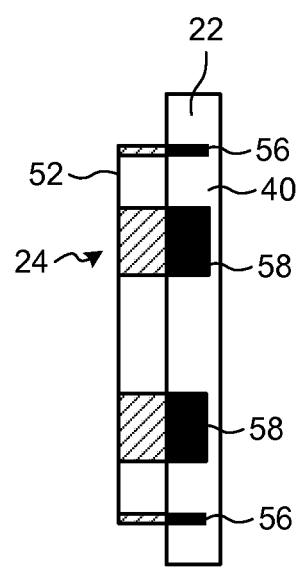
FIG. 9 is a side view illustrating the relation between the second housing and the third housing.

The LCD module 3 will be described in greater detail. FIG. 3 is a sectional view along plane α in FIG. 2. FIG. 4 is a sectional view along plane β in FIG. 2. FIG. 5 is an enlarged sectional view of the LCD module. FIG. 6 is a perspective view of a schematic structure of a second housing. FIG. 7 is a perspective view of a schematic structure of a third housing. FIG. 8 is a front view illustrating the relation between the second housing and the third housing. FIG. 9 is a side view illustrating the relation between the second housing and the third housing. In FIGS. 3 to 5, the display surface PE of the LCD module 3 is positioned on the upper side, and the surface on the light source 2 side is positioned on the lower side. FIG. 8 schematically illustrates the second housing and the third housing viewed from the light source 2. In the LCD module 3, directions are defined as follows in a projective view in a direction orthogonal to the display surface PE: a direction toward the center of an LCD panel 12 (that is, the center of the display surface PE) is an inward direction, and a direction away from the center of the LCD panel 12 (that is, the center of the display surface PE) is an outward direction. In a cross section of the LCD module 3, a direction toward the center of the LCD panel 12, that is, a direction toward the center of the display surface PE is the inward direction, and a direction away from the center of the LCD panel 12, that is, a direction away from the center of the display surface PE is the outward direction.

As illustrated in FIGS. 2 and 3, the LCD module 3 includes the LCD panel 12, an optical member 14, and a housing 16. The LCD panel 12 displays the image P. The optical member 14 is arranged on the light source 2 side of the LCD panel 12. The housing 16 is arranged around the LCD panel 12 to protect the LCD panel 12.

Application of a voltage causes the LCD panel 12 to orient liquid crystals and transmit light traveling in a specific direction, thereby switching whether incident light passes through the LCD panel 12. Thus, the LCD panel 12 can emit light of an image. The LCD panel 12 may be an LCD device of any type, such as a fringe field switching (FFS) type, an in-plane switching (IPS) type, a twisted nematic (TN) type, an optically compensated bend/optically compensated birefringence (OCB) type, or an electrically controlled birefringence (ECB) type. In other words, as long as the LCD panel 12 displays an image, the LCD panel 12 may employ any circuit configuration and any liquid crystal structure. In the LCD module 3, the display surface PE of the LCD panel 12, on which an image is displayed, has a rectangular shape as illustrated in FIG. 2.

The LCD panel 12 includes a substrate unit and a plurality of polarizing plates, for example. The substrate unit displays an image. The pair of polarizing plates is arranged on the surface of the substrate unit with the substrate unit interposed therebetween. The substrate unit is provided with wiring, electrodes, color filters, and other components corresponding to a plurality of pixels. The substrate unit controls a voltage applied to the wiring and the electrodes corresponding to each pixel, thereby controlling an electric field formed in a liquid crystal layer corresponding to each pixel. Thus, the substrate unit switches the polarized state of light in each pixel.

The optical member 14 includes two optical sheets 14a and 14b. Examples of the optical sheets 14a and 14b include, but are not limited to, a diffusion sheet, and a lens sheet. The optical member 14 needs to include at least one optical sheet, and the number of optical sheets is not limited.

The housing 16 supports the LCD panel 12 and the optical member 14 at a position on the LCD panel 12 and the optical member 14 not overlapping with the display surface PE. The housing 16 is arranged at a position overlapping with a part of the outer surface of the LCD panel 12. In other words, the LCD panel 12 is arranged inside the housing 16. The housing 16 has an opening at the center thereof and is arranged at the entire outer surface of the side surface of the LCD panel 12 (outer edge of the display surface PE). In other words, the housing 16 is a frame having an opening on the inner side. The display surface PE of the LCD panel 12 and the surface opposite thereto are exposed through the opening of the housing 16.

The housing 16 includes a first housing 20, a second housing 22, a third housing 24, and a double-sided tape 26. The housing 16 protects the LCD panel 12 with the first housing 20 and the second housing 22 and protects the optical member 14 with the second housing 22 and the third housing 24. The double-sided tape 26 adheres to the LCD panel 12 and the second housing 22, thereby fixing the LCD panel 12 to the second housing 22. The first housing 20, the second housing 22, and the third housing 24 are made of a resin, a metal, such as a stainless steel, or the like. The first housing 20, the second housing 22, and the third housing 24 are preferably made of a rigid material. With this configuration, the LCD panel 12 can be suitably supported and protected from external stress, for example.

The first housing 20 includes a side-surface part 30 and a front-surface part 32. The side-surface part 30 has a frame shape surrounding the outer periphery of the LCD panel 12 and faces the side surface (surface orthogonal to the display surface PE) of the LCD panel 12. The front-surface part 32 is connected to an end of the side-surface part 30 on the display surface PE side and protrudes inward to face the front surface of the LCD panel 12. The front-surface part 32 has a display opening 34 at a portion overlapping with the display surface PE. Thus, a cross section of the side-surface part 30 and the front-surface part 32 has an L-shape as illustrated in FIGS. 3 and 4, and the first housing 20 faces the surface on the display surface PE side and the side surface of the LCD panel 12. The first housing 20 has a cutout at an end surface away from the LCD panel 12 in the cross section of the portion where the display opening 34 is formed. This structure makes it possible to display an image displayed on the display surface PE at a broader angle. The first housing 20 has a cutout 36 through which a wiring substrate 13 of the LCD panel 12 passes at a part of the side-surface part 30.

The second housing 22 includes a side-surface part 40 and a back-surface part 42. The side-surface part 40 has a frame shape surrounding the outer periphery of the LCD panel 12 and faces the side surface (surface orthogonal to the display surface PE) of the LCD panel 12. The side-surface part 40 is arranged outside the side-surface part 30 of the first housing 20. In other words, the inner surface of the side-surface part 40 faces the outer surface of the side-surface part 30. The back-surface part 42 is connected to an end of the side-surface part 40 on the side opposite to the display surface PE side, that is, on the light source 2 side, and protrudes inward to face the back surface (surface on the light source 2 side) of the LCD panel 12. The back-surface part 42 has a display opening 44 at a portion overlapping with the display surface PE. Thus, a cross section of the side-surface part 40 and the back-surface part 42 has an L-shape as illustrated in FIGS. 3 and 4, and the second housing 22 faces the surface on the light source 2 side and the side surface of the LCD panel 12. As illustrated in FIGS.

3, 4, and 6, the second housing 22 has openings 46 at portions outside the display opening 44 of the back-surface part 42.

The third housing 24 includes a back-surface part 52, a plurality of top-and-bottom-surface protrusions 56, and a side-surface protrusions 58. The back-surface part 52 is a plate member arranged closer to the light source 2 than the back-surface part 42 of the second housing 22. The back-surface part 52 has a display opening 54 at a portion overlapping with the display surface PE. As illustrated in FIGS. 3, 4, and 7, the third housing 24 has the top-and-bottom-surface protrusions 56 and the side-surface protrusions 58 formed outside the display opening 54 at predetermined intervals in a manner surrounding the display opening 54.

As illustrated in FIG. 3, the top-and-bottom-surface protrusions 56 are formed at the ends in the shorter direction of the display surface PE (on the side provided with the wiring substrate 13 and the side opposite thereto) and protrude toward the display surface PE. The top-and-bottom-surface protrusions 56 each have a protrusion 59 protruding outward. A positioning portion 60 is provided to the surface of the top-and-bottom-surface protrusions 56 on the side opposite to the wiring substrate 13 side. The positioning portion 60 is used to position the LCD panel 12 during assembly. The side-surface protrusions 58 are formed at the ends in the longer direction of the display surface PE and protrude toward the display surface PE. The top-and-bottom-surface protrusions 56 are elastically deformed against the back-surface part 42.

As illustrated in FIGS. 8 and 9, the housing 16 is formed such that the openings 46 of the second housing 22 correspond to the top-and-bottom-surface protrusions 56 or the side-surface protrusions 58 of the third housing 24. The housing 16 is assembled with the top-and-bottom-surface protrusions 56 and the side-surface protrusions 58 inserted into the respective openings 46 and protruding toward the front-surface part 32 of the first housing 20. In the housing 16, the protrusions 59 of the top-and-bottom-surface protrusions 56 come into contact with portions outside the portions where the openings 46 are formed in the back-surface part 42 of the second housing 22, thereby preventing the third housing 24 from coming off from the second housing 22. Thus, the third housing 24 is supported by the second housing 22.

In the housing 16, the top-and-bottom-surface protrusions 56 and the side-surface protrusions 58 are inserted into the openings 46 of the second housing 22 with the optical member 14 arranged on the back-surface part 52 of the third housing 24. Thus, the third housing 24 can be fixed to the second housing 22 with the optical member 14 interposed between the second housing 22 and the third housing 24. The top-and-bottom-surface protrusions 56 on both of the two sides opposite to each other in the third housing 24 may be simultaneously inserted into the openings 46. Alternatively, after the top-and-bottom-surface protrusions 56 on one side are inserted into (caught by) the openings 46, the top-and-bottom-surface protrusions 56 on the other side may be inserted into the openings 46. When each top-and-bottom-surface protrusion 56 is inserted into a corresponding opening 46, the protrusion 59 comes in contact with the edge of opening 46 and is thereby elastically deformed. When the insertion is finished, each top-and-bottom-surface protrusion 56 returns to a shape in a no-load state, and the surface of each top-and-bottom-surface protrusion 56 on the side of the back-surface part 42 comes in contact with the back-surface part 42. Subsequently, the LCD panel 12 is placed on the display surface PE side of the second housing 22, and the first housing 20 is then placed on the display surface PE side of the second housing 22. Thus, the housing 16 is assembled.

The housing 16 has the configuration described above. As illustrated in FIGS. 3 and 4, in the housing 16, the LCD panel 12 is sandwiched between the front-surface part 32 of the first housing 20 and the back-surface part 42 of the second housing 22. Thus, the LCD panel 12 is protected. The LCD panel 12 is fixed to the back-surface part 42 of the second housing 22 with the double-sided tape 26.

In the housing 16, the optical member 14 is sandwiched between the back-surface part 42 of the second housing 22 and the back-surface part 52 of the third housing 24. Thus, the optical member 14 is supported at a predetermined position with respect to the LCD panel 12. Because the optical member 14 is arranged in a space formed by the back-surface part 42 of the second housing 22 and the back-surface part 52 of the third housing 24, the optical member 14 can be moved in the space. Specifically, the housing 16 is made by inserting the top-and-bottom-surface protrusions 56 and the side-surface protrusions 58 into the openings 46 of the second housing 22 to fix the third housing 24 to the second housing 22. This structure allows the housing 16 to be kept in a state in which a width of the space between the back-surface part 42 of the second housing 22 and the back-surface part 52 of the third housing 24 is variable. The optical member 14 is sandwiched between the back-surface part 42 of the second housing 22 and the back-surface part 52 of the third housing 24 without arranging an elastic body or the like therebetween such that the width of the space is variable, thereby reducing pressure on the optical member 14 from the back-surface part 42 of the second housing 22 and the back-surface part 52 of the third housing 24 or keeping the optical member 14 in a state of non-contacting with one of the back-surface part 42 of the second housing 22 and the back-surface part 52 of the third housing 24. Thus, if the optical member 14 is extended by heat, the space can absorb the extension, thereby suppressing load on the optical member 14. As a result, it is possible to suppress wrinkles and distortion on the optical member 14. In other words, even in a case where the LCD module 3 is heated to high temperature by light emitted from the light source 2 or cooled to low temperature by being placed in a cold area, the housing 16 can prevent the optical member 14 from being compressed and strained. As a result, it is possible to suppress uneven display and image distortion caused by the optical member 14. In the housing 16, it is preferable that the width of the space between the back-surface part 42 of the second housing 22 and the back-surface part 52 of the third housing 24 is greater than the thickness of the optical member 14.

In the housing 16, the top-and-bottom-surface protrusions 56 and the side-surface protrusions 58 of the third housing 24 protrude toward the front-surface part 32 of the first housing 20 through the second housing 22 to face the side surface of the LCD panel 12. Thus, the top-and-bottom-surface protrusions 56 and the side-surface protrusions 58 serve as positioning members for the LCD panel 12 on a plane parallel to the display surface PE. In other words, the housing 16 can use the third housing 24 as a mechanism that supports the optical member 14 and a mechanism that positions the LCD panel 12. The third housing 24 has a plurality of functions as described above, thereby reducing the number of components and simplifying the configuration of the device.

The housing 16 may have a viewing window used to check whether an optical member is arranged at the portion where the optical member 14 has to be arranged on the back-surface part 52 of the third housing 24. This configuration makes it possible to check whether a proper number of optical members are arranged.

While the shape of the display surface PE of the LCD panel 12 according to the present embodiment is rectangular, the shape is not limited thereto. The LCD panel 12 may have a square shape. The LCD panel 12 does not necessarily have a rectangular shape; it may have a parallelogrammatic, oval, circular, or polygonal shape. Similarly to the LCD panel 12, the housing 16 may have any shape.

While the present disclosure has been explained, the contents described above are not intended to limit the present disclosure. The components described in the present disclosure include components easily conceivable by those skilled in the art and substantially identical components, that is, what is called equivalent components. The components described above may be appropriately combined. Various omissions, substitutions, and changes in the components may be made without departing from the spirit of the present disclosure. While the LCD panel serves as a display panel that displays an image, and the LCD module serves as a display module in the embodiment above, for example, these components are not limited thereto. A display panel, other than the LCD panel, that displays an image may be used as the display module. Also in this case, suppression of deformation in the optical member of the display panel can suppress uneven display. As a result, it is possible to make the device thinner and suppress an increase in the number of parts.

The display module according to the present embodiment is also applicable to electronic apparatuses in all fields, such as car navigation systems, television devices, digital cameras, laptop personal computers, portable electronic apparatuses including mobile phones, and video cameras, besides the head-up display device. In other words, the display module according to the present embodiment is applicable to electronic apparatuses in all fields that display an externally received image signal or video signal, or an internally generated image signal or video signal as an image or video. Such electronic apparatuses each include a control device that supplies the video signal to the display panel and controls operations of the display panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display module comprising:
a display panel having a display surface that displays an image and a back surface that is opposite to the display surface;
an optical member having a sheet shape and overlapped with the display panel; and
a housing that supports the display panel and the optical member, wherein
the housing comprises:
 a first housing that covers an outer periphery of the display panel and that has a first display opening to expose the display surface, an end of the first housing on a display surface side of the display panel protruding toward the center of the display surface to face an outer edge of the display surface;
 a second housing that covers the outer periphery of the display panel and that includes
  a second display opening overlapping the display surface in a plan view, and
  a second periphery that is around the second opening and is disposed on a back surface side of the display panel, the second housing being connected to the first housing, and an end of the second housing on a side opposite to the display surface side of the display panel protruding toward the center of the display surface to face an outer edge of a surface opposite to the display surface; and
 a third housing that is arranged on a side of the second housing opposite to a first housing side and that includes
  a third opening overlapping the display surface in the plan view, and
  a third periphery that is around the third opening and is disposed on the back surface side of the display panel, the third housing being connected to the second housing,
wherein the optical member is supported by the second periphery and the third periphery.

2. The display module according to claim 1, wherein
the third housing has a protrusion protruding toward the first housing, and
the protrusion is inserted into the second housing to cover the periphery of the display panel and serves as a positioning member for the display panel on a plane parallel to the display surface.

3. The display module according to claim 2, wherein a portion of the protrusion which is inserted into the second housing protrudes toward the outer edge with respect to the second opening of the second housing to come into contact with a surface of the second housing on the first housing side.

4. The display module according to claim 1, wherein the display panel is an LCD panel.

5. A display device comprising:
the display module according to claim 1;
a light source that emits light to the display module; and
an optical system that is arranged on a side opposite to the light source across the display module and guides the light passing through the display module to a display surface on which an image is displayed.

* * * * *